United States Patent [19]
Langley

[11] Patent Number: 5,948,708
[45] Date of Patent: Sep. 7, 1999

[54] VAPOR PROTECTION SUIT AND FABRIC HAVING FLASH FIRE RESISTANCE

[76] Inventor: John D. Langley, 1904 Forest Dr., Guntersville, Ala. 35976

[21] Appl. No.: 08/610,000

[22] Filed: Feb. 29, 1996

Related U.S. Application Data

[63] Continuation-in-part of application No. 08/201,674, Feb. 25, 1994, abandoned.

[51] Int. Cl.$^6$ ..................................................... B32B 27/00
[52] U.S. Cl. ........................ 442/131; 442/132; 442/133; 442/136; 442/236; 442/230; 442/231; 442/228; 442/135
[58] Field of Search ..................................... 442/131, 132, 442/133, 136, 236, 230, 231, 228; 428/286, 296, 298, 369, 198, 287, 302; 604/380, 370

[56] References Cited

U.S. PATENT DOCUMENTS

| | | | |
|---|---|---|---|
| 4,509,559 | 4/1985 | Cheetham et al. | 138/121 |
| 4,583,247 | 4/1986 | Fingerhut et al. | 2/69 |
| 4,792,480 | 12/1988 | Freund et al. | 428/286 |
| 4,855,178 | 8/1989 | Langley . | |
| 4,994,317 | 2/1991 | Dugan et al. . | |
| 5,110,668 | 5/1992 | Minnick | 428/215 |
| 5,153,055 | 10/1992 | Ko | 428/224 |

*Primary Examiner*—Marion McCamish
*Assistant Examiner*—Arti R. Singh

[57] ABSTRACT

A multi-layer composite consisting of a chemical barrier layer of, a flame resistant layer, and a reflective layer. The chemical barrier layer is itself a composite material having multiple substrates selected to minimize permeability.

9 Claims, 1 Drawing Sheet

VAPOR PROTECTION SUIT AND FABRIC HAVING FLASH FIRE RESISTANCE

This application is a continuation-in-part of application Ser. No. 08/201,674, filed Feb. 25, 1994 now abandoned entitled Vapor Protection Suit and Fabric Having Flash Fire Resistance, John D. Langley, et al., applicants

FIELD OF THE INVENTION

The present invention relates to chemical protective units and the fabrics used therein. More particularly, the present invention relates to protective clothing commonly referred to as totally encapsulating suits and the fabric of which such suits are constructed. In even greater particularity, the present invention relates to composite fabrics having chemical, flame, chemical flash fire, and tear-resistant qualities and to garments made therefrom.

BACKGROUND OF THE INVENTION

Earlier U.S. Pat. Nos. 4,833,010; 5,169,697; 4,938,817; and 4,683,593, owned by the common assignee herewith show part of the recent evolution in protective garments. As noted in the U.S. Pat. Nos. 4,833,010 and 5,169,697, hazardous materials handling personnel and particularly emergency response personnel are increasingly called upon to place themselves at risk in toxic and life threatening environments. Perhaps the most severe of these is associated with industrial accidents or spills involving materials which are unknown to the response team. In these environments the use of a totally encapsulating vapor protective suit is a virtual necessity. The development of the U.S. Pat. No. 4,833,010 material for use in such suits was a major step forward in enhancing the survival expectations of hazardous materials' response teams. For example, the breakthrough time for the U.S. Pat. No. 4,833,010 material is over eight hours for the chemicals tested under the ASTM F1001 Chemical Test Battery; however, previous suits made of PVC, Viton® chlorobutyl, butyl, or neoprene showed selective permeation of some of these chemicals in as little as two minutes. This, the U.S. Pat. No. 4,833,010 material substantially aided in resolving the dilemma facing an emergency team responding to an unknown hazard, however, as may be seen, the U.S. Pat. No. 4,833,010 material, like most other barrier materials is essentially thermoplastic in nature. Accordingly, an emergency response person responding to an incident involving unknown volatile and/or toxic chemicals would be at risk if a build-up of volatile vapors externally of the suit ignited. Such a "chemical flash fire" can generate intense heat of up to 2000° F. for a few seconds, depending on the combustion material. Exposure of a thermoplastic or elastomeric chemical barrier suit to such temperatures would have instantaneous deleterious consequences.

As a result, chemical barrier suits which have a low thermal tolerance yet provide high chemical barrier protection are worn in conjunction with a second or oversuit made of a material such as metallized fiberglass or Nomex®. These metallized suits offer high reflectivity to reduce radiant energy transferred to the inner suit and high flame resistance to reduce heat transfer by convection and conduction to the inner suit but no chemical protection. Thus, by wearing two suits, hazardous materials' response personnel can escape from a flash fire with their chemical protection intact.

It has been recognized that wearing two suits, looking through two visors, etc. is less than desirable. Also, transporting and storing two suits for each of the response personnel is cumbersome and occupies valuable space on response vehicles. As would be expected, donning two suits materially increases the response time of the wearer. These problems are self-evident. One prior patent which ostensibly addresses such problems is U.S. Pat. No. 4,793,480 which discloses and claims a fabric and garment which assertedly would be useful in protective garments. However, the teachings of the patent do not address how the garment is to be made for the fabric, and the use of an outer layer of a polyethylene film seems an invitation to disaster upon flame impingement. That is, the outer layer is believed to be flammable and thus would serve to cause precisely the catastrophe it seeks to avoid. Thus the U.S. Pat. No. 4,792,480 patent does not present a usable material in actual practice and a need exists for a composite material which can be fabricated into a vapor protective suit for hazardous materials' response personnel which needs on adjunctive suit.

SUMMARY OF THE INVENTION

It is the principal object of this invention to provide a unitized material which will afford a greater degree of protection when used in a protective garment.

In the furtherance of the principal object, it is a further object of this invention to provide a unitized or composite fabric for use in protective garments which will allow the hazardous materials response personnel to wear a single protective garment.

Still in the furtherance of the aforesaid objects, it is the object of the present invention to provide a composite fabric which affords superior permeation protection against a wide variety of chemicals, high reflectance of radiant energy, and high resistance of heat convection due to flame impingement.

A further object of the invention it to provide a composite fabric which can be formed into a garment in a manner that will seal sewn seams therein to ensure the integrity of the chemical barrier.

Yet another object of the present invention is to provide a composite fabric for us in protective garments which has a higher tear strength than prior ensemble fabrics.

These and other objects and advantages of our invention are accomplished through a novel combination of various layers of protective material in a composite fabric which exceeds the protection afforded by any known protective garment or ensemble of garments, yet is as flexible and comfortable as many chemical protective garments which do not provide flash fire protection.

The fabric is a multi-layer composite consisting of a chemical barrier layer of material, a flame resistant layer of material, and a reflective layer of material. The chemical barrier layer is itself a composite material having multiple substrates of material selected to minimize permeability. Inasmuch as the substrate adjacent the flame resistant layer is a thermoplastic resin layer, these layers can be bonded together by the application of heat and pressure. The reflective layer is deposited on the flame resistant layer by known processes.

BRIEF DESCRIPTION OF THE DRAWINGS

The nature of the present invention is more readily understood by reference to the drawings which are appended hereto and which form a portion of this disclosure, wherein.

DESCRIPTION OF PREFERRED EMBODIMENT

Figure 1:
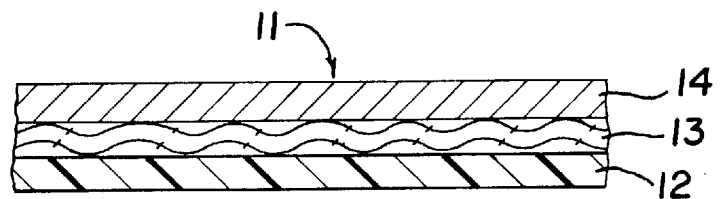
FIG. 1 is a section view of the composite fabric showing the functional layers in the material.
Figure 2:
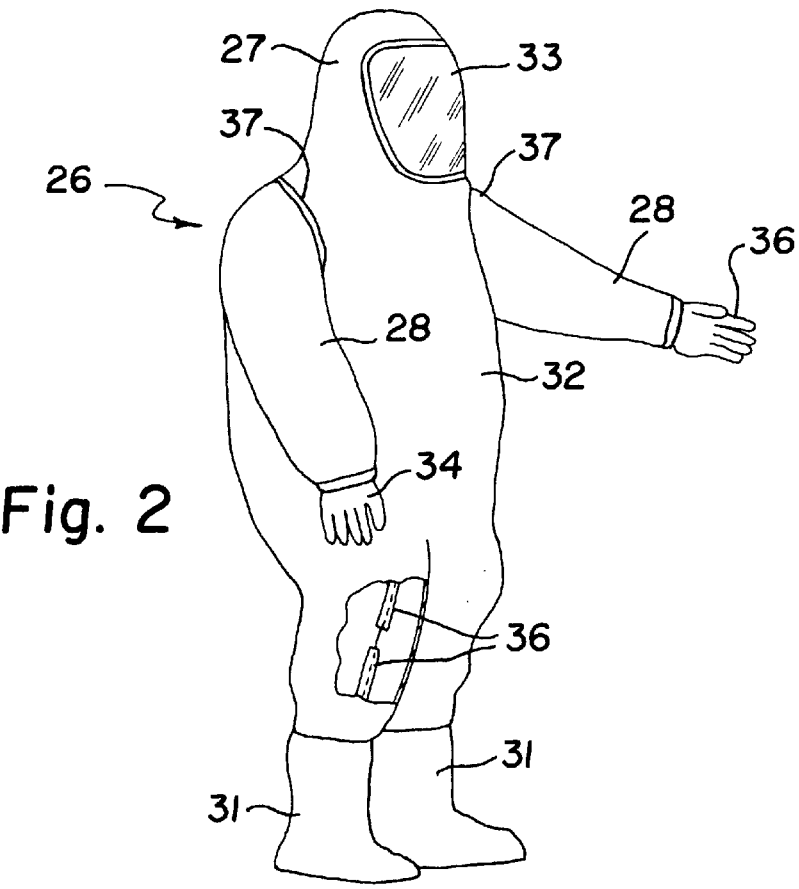
FIG. 2 is a depiction of a garment partially broken away and partially in section showing the seams and layers of material in the composite fabric.
Figure 3:
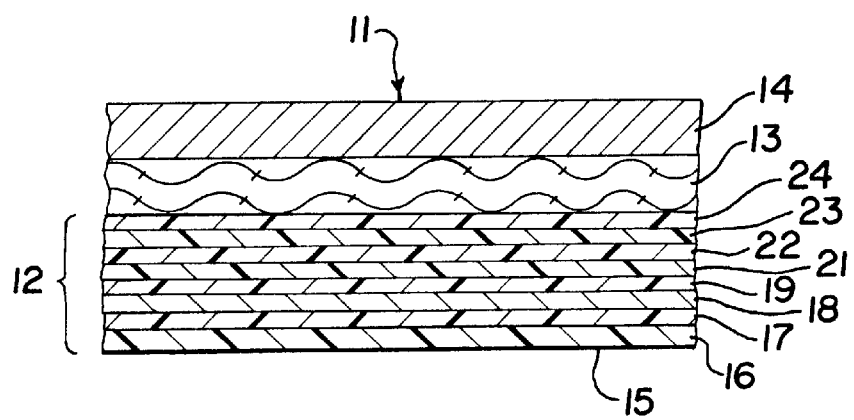
FIG. 3 is a sectional view of the composite fabric showing the strata of a preferred chemical barrier layer.

Referring to the drawings for a clearer understanding of the invention, it may be seen in FIG. 1 that the fabric 11 embodying this invention consists of three functional layers of material which are bonded together to form a composite fabric. Layer 12 is a chemical barrier layer and affords protection against a wide variety of chemicals. Layer 13 is flame resistant layer of material which blocks flame impingement on the thermoplastic inner layer 12. Layer 14 is a reflectant layer, that is to say, layer 13 may be aluminized by layer 14 to create a reflective surface on one side thereof. Alternatively, the layer 14 may be a reflective layer of a material such as metallized polyethylene terephthalate. In either event, layer 14 is designed to prevent radiant energy loading of layers 12 and 13 when exposed to a chemical flash fire. It is noteworthy to mention that the present invention is not intended for use in a "firefighter suit" where long duration exposure to thermal loading by radiant, convection, or conductive heating occurs. Rather, the present invention is primarily a chemical protection suit which is self-protecting against sudden short duration fires, such as might be encountered when flammable vapors are ignited within a confined space. By way of example, a test chamber filled with flammable vapors has been used to test the efficacy of this material by placing a garment portion defining a sealed internal cavity within the chamber and igniting the vapors. The vapors are "flashed" in an almost explosive manner, such that short duration temperatures of about 2000° F. are generated. Such temperatures would be sufficient to destroy a thermoplastic or elastomeric suit or to char a polyethylene coating as used in the U.S. Pat. No. 4,792,480 fabric, however, the instant fabric shows no damage and maintains the interior of the cavity at a temperature below 175° F. Thus, hazardous materials' personnel wearing a suit of this material would be exposed to a moderate thermal gradient within the suit, e.g., an increase in temperature from 80° or 90° to 175° F., while exposed to an external thermal gradient of 1900° F. Such protection would ensure that the thermoplastic inner layer 12 does not collapse or melt onto the wearer, thus, the wearer would be able to escape the area before any further thermal loading might occur.

As noted above, metallized polyethylene terephthalate may be used as layer 14. Polyethylene terephthalate has heat resistance to 300° F. and is classified as a slow burning to self-extinguishing plastic according to ASTM standards. It may be bonded to layer 13 which is ideally a woven fiberglass layer which provides an economical fire retardant layer. Other materials suitable for use in this layer are carbonized fibers (pre-ox), flame-retardant rayon, flame-retardant cotton, flame-retardant wool, high density polyethylene and aramid fibers. It will be appreciated that each of the foregoing materials can be metallized or aluminized to yield a highly reflective layer 14 other than with metallized polyester. However, such materials forming layer 13 and 14 alone are totally inadequate for chemical protection. Such materials are commercially available and in the fabrication of the fabric of this invention, layers 13 and 14 are purchased as a metallized fabric.

Chemical barrier 12 is ideally a multi-chemical barrier such as disclosed in the U.S. Pat. No. 5,169,697 patent in the composition of the sealing tape claimed therein. One preferred embodiment for chemical barrier 12 would be a co-extruded multi-stratum composite having a layer of linear low density polyethylene 15 adjacent a layer of nylon 16 adjacent a layer of ethylene vinyl alcohol 17, adjacent a layer of nylon 18, adjacent a layer of polyethylene 19, adjacent a layer of chlorinated polyethylene 21, adjacent a layer of ethylene vinyl acetate 22, adjacent a layer of polyvinylidene chloride 23, adjacent a layer of ethylene vinyl acetate 24. Additionally, layers of teflon, nylon, polypropylene, acrylonitrile, metallized thin films, and polyvinylidene chloride copolymers may be substituted or added as desired. The disclosure regarding specific combinations thereof which are suitable to act as a barrier to a wide variety of chemicals as set forth in U.S. Pat. No. 5,169,697 is herewith incorporated by reference. The chemical barrier material disclosed in U.S. Pat. No. 4,833,010, also incorporated herein by reference, may also be utilized.

The chemical barrier layer 12 and the metallized fabric of layers 13 and 14 are bonded together by applying heat and pressure, for example up to 300° F. at 40 psi, to bond the chemical barrier layer to the flame-resistant impingement layer to form the composite fabric.

The bonding may be accomplished due to a polymer layer of the chemical barrier which is heat sealable being positioned adjacent the fiberglass layer, and the material then being concomitantly passed through a heated roller.

Alternatively, a tie film of a sealable polymer is introduced between the fiberglass and chemical barrier, such that subsequently the composition is formed bypassing the layer through a heated holler system Likewise, heat and pressure may be selectively applied to form the composite material through extrusion lamination wherein plastic chips are melted in an extruder to form a thin plastic film which is immediately applied atop of the fiberglass and the barrier layer is applied atop the extruded sheet. The composite then passes between two rollers under pressure, a roller being chilled to solidify the extruded sheet bonding the chemical barrier to the flame barrier.

The fabric 11 is then cut in accordance with a pattern for a number of cooperative pieces to be sewn together to form a totally encapsulating suit 26 including a head cover 27, arm covers 28, leg covers 29 including footlets 31 and torso cover 32. The head cover 27 includes a visor 33 and the arms are connected in an airtight manner to a pair of gloves 34. Stitching of these seams in the sewing process, however, vitiates the chemical barrier protection, therefore, seam tape 36 such as that of the U.S. Pat. No. 5,169,697 patent is applied to the seams internally of the garment, thereby restoring the chemical barrier. A second layer of seam tape 37 may be applied to the exterior of the garment, however, testing has shown the polyethylene and other polymer tapes subjected to "chemical flash fires" of the intensity expected in the hazardous materials environment are immediately consumed or removed by the incident radiant energy. It is to be understood that a totally encapsulating suit is one which enclosed the entire body of the wearer and his breathing apparatus and is intended to be impermeable to vapors and liquids.

Clearly, such an occurrence can leave a char or polymer residue on the reflective surface 14 adjacent the seams which degrades the reflective qualities in that area (not unlike the result expected with the U.S. Pat. No. 4,792,480 material) thereby subjecting the seam area to increased radiant energy absorption. Consequently, if a tape is applied to the metallized reflective surface 14, it would preferably be a metallized tape having reflective characteristics similar to layer 14.

It may be seen from the foregoing that a unitized suit offering both chemical barrier protection and short-term thermal protection is provided thereby eliminating the need for the use and storage of suit ensembles to give this level of protection. However, an unexpected result of the creation of this new composite fabric actually gives superior overall protection than a separate chemical barrier suit worn with a thermal overcover. The chemical barrier suit has a relatively low tensile strength. The overcover suit made from the reflective layer 14 and flame barrier layer 13 has somewhat greater tensile strength, however, the fabric of the instant invention has a tensile strength greater than the combined strength of the two suits. Testing has shown the tensile strength of the respective materials to be:

|  | Machine Directional | Cross Directional |
|---|---|---|
| Composite fabric | 409.7 lbs. | 208.2 lbs. |
| Chemical layer | 34.5 lbs. | 20.8 lbs. |
| Metallized fabric layer (fiberglass) | 263.8 lbs. | 86.9 lbs. |

Thus, the composite fabric yields a protective garment which is not only more efficient and user friendly but also offers a greater degree of protection in an economical manner.

It will also be appreciated that the fabric can be sewn to meet other requirements such as tent-like shelters or palletization enclosures where potential chemical vapor exposure may be expected.

Comparative Studies

A study was undertaken to evaluate and compare the thermal performance properties of three materials. These materials are designed, in concept, to offer both chemical resistance and thermal/reflective characteristics. Two of the materials (later named as Samples "B" and "C") represent fabrics as described in the Dec. 20, 1988 (U.S. Pat. No. 4,792,480 Freund et al.), and the third is a representative of the fabric described in the present invention (later named as Sample "A"). It should be noted that the inventive material is currently a commercially available fabric under the Safety Group Reflector™, while the Freund et al. conceptual material has not been offered to either the scientific community or the commercial market.

Technical Contention & History

The Freund et al. patent describes a seven (7) layer composite beginning with a clear, heat sealable, flame retardant polyethylene outer-layer, second layer being a metal foil or metallized film having a high degree of reflectivity, the third layer being a flame retardant thermoplastic film used as an adhesive layer, the fourth layer acting as the primary chemical resistant layer, the fifth layer being a flame retardant thermoplastic film used as a tie layer, the sixth layer being a cloth substrate providing strength to the overall composite not necessarily being a flame resistant layer, and the seventh layer being a flame retardant thermoplastic film used as a heat seal layer if heat sealing the interior of the garment is desired.

The present invention describes a simple composite that will achieve superior chemical and thermal performance over the Freund et al. patent. The Sample A material is comprised of an aluminized outer layer, an adhesive tie layer, a flame resistant middle layer that also provides strength for the composite, and an interior coextruded film layer that acts as the primary chemical barrier as well as offering a heat sealable surface for the interior of a garment.

It is contended that any non-IR invisible layer applied to the outer surface of a metallic film or foil will significantly decrease the thermal performance of a composite. I am not aware of any optically clear, flame retardant polyethylene film as described in the Freund et al. patent. Flame retardant additives typically add a yellow or opaque tinge to an otherwise clear film. Freund et al. suggestion of optically clear, flame retardant polyethylene films exhibit IR-invisible characteristics is without support.

The performance of the primary chemical layer is best preserved if placed behind the aluminized radiant and flame resistant thermal protective layers in the Sample A application rather than beneath the radiant layer and in front of the substrate as described in the Freund et al. patent. The non-flame retardant primary chemical layer described in the Freund et al. patent will see significantly more conductive and radiant heat than will the primary chemical layer in the Sample A application.

Technical Evaluation

Material Development

The three materials used in this evaluation are described below. Sample "A" represents a fabric of the present invention while Samples "B" and "C" represent variations of the Freund et al. patent. Samples were fabricated using Kappler's Reflector fabric as the base material and applying films to the outer surface using simple direct heat lamination techniques. The 1 mil non-flame retardant polyethylene film represents the optically clear outer layer described in the Freund et al. patent. The 2 mil flame retardant polyethylene film is the closest representative to the Freund et al. flame retardant polyethylene film alternative. As mentioned above, I am not aware of any optically clear, IR-invisible polyethylene films. Both candidate films were thermally laminated to the Reflector base fabric using a heat press (375° F.). Film samples were applied to Reflector using initial 3.5 sec dwell time followed by a subsequent 1.5 sec dwell. The press operated at approximately 90 psi.

The 1 mil polyethylene film was cut from a common storage bag. DAF 919 (Dow Chemical) was used as the 2 mil flame retardant polyethylene film.

Sample "A": Reflector

Sample "B": 1 mil non-IR polyethylene film/Reflector

Sample "C": 2 mil flame retardant polyethylene film/Reflector

Flammability Testing

Candidate samples were tested for flammability characteristics in accordance with NFPA 1991–1994 edition, Section 9-7 (herein incorporated by reference). Five samples of each material were evaluated as shown in Table 1. Per the method, the samples were folded to create a 0.25-in radius and exposed to a methane flame at a distance of 0.75-in from the edge of the sample to the top of the burner. The flame height was set at 1.25-in. An initial 3 sec exposure was followed by a secondary 12 sec exposure. Propensity for ignition and sustaining a flame were recorded along with char length. Criteria for failure are set by NFPA, as (1) any ignition during the initial 3 sec exposure, (2) any secondary ignition during the subsequent 12 sec exposure lasting greater than 10 sec, or (3) a char length greater than 102 mm.

Table 1 shows that only Sample "A" fabric passes the stringent requirements of the NFPA flammability tests. Sample "B" failed as a result of ignition during the 3 sec exposure while Sample "C" failed as a result of extended after flame and char length.

TABLE 1

Flame Test per NFPA 1991–1994

| Sample No. | 3 sec Ignition | 12 sec Ignition | Char Length (mm) | Pass/Fail |
|---|---|---|---|---|
| Sample "A" Reflector | | | | |
| 1 | NO | 0 | 45 | PASS |
| 2 | NO | 0 | 43 | PASS |
| 3 | NO | 0 | 43 | PASS |
| 4 | NO | 0 | 45 | PASS |
| 5 | NO | 0 | 43 | PASS |
| 6 | NO | 0 | 43 | PASS |
| AVERAGE | PASS | PASS | 43.8 | PASS |
| Sample "B" 1 mil Non-Flame Retardant Polyethylene/Reflector | | | | |
| 1 | NO | 7.4 | 65 | PASS |
| 2 | NO | 2.9 | 50 | PASS |
| 3 | NO | 26.8 | 70 | FAIL |
| 4 | NO | 2 | 55 | PASS |
| 5 | YES | N.D. | N.D. | FAIL |
| AVERAGE | FAIL | N.D. | N.D. | FAIL |
| Sample "C" 2 mil Flame Retardant Polyethylene/Reflector | | | | |
| 1 | NO | >30 | CONSUMED | FAIL |
| 2 | NO | 0 | 71 | PASS |
| 3 | NO | 2 | 88 | PASS |
| 4 | NO | 7.7 | 111 | FAIL |
| 5 | NO | 2.6 | 65 | PASS |
| AVERAGE | PASS | >8.5 | >102 | FAIL |

Radiant Reflective Performance

Radiant reflective performance (RRP) is the industry accepted technique for evaluating the reflective performance of a protective fabric. The test method is cited in NFPA 1976–1992 edition, herein incorporated by reference. Preconditioning of test samples is normally conducted by abrading the sample for 300 cycles using a heavy cotton duct material. The necessary abrasion equipment was not available for this evaluation therefore, samples were not abraded prior to RRP significantly affect RRP ratings.

The test basically exposes a sample to a 100% radiant heat load and records the time to pain on skin and time to second degree (blistering) burn. A 100% radiant heat load at a flux of 2 cal/cm$^2$/min is applied to the sample at a distance of 1-in. The resulting temperature is measured on the inside of the sample by way of copper sensor fitted with three Type "J" thermocouples. Readings are made in mVs with subsequent interpolation of time to pain and burn as interpreted using the industry standard "Stoll" curve.

It becomes obvious from Table 2 that the virgin Reflector material exhibits significantly longer time to pain and to burn values than the outer samples. This confirms the fact that emissivity of a reflective fabric is significantly affected by non-IR invisible top coats and films.

TABLE 2

Radiant Reflective Performance Testing - NFPA 1976–1992 Edition

| Sample No. | Sample "A" Reflector | | Sample "B" Non-Flame Retardant Polyethylene/ Reflector | | Sample "C" Flame Retardant Polyethylene/ Reflector | |
|---|---|---|---|---|---|---|
| | Time to Pain (sec) | Time to Burn (sec) | Time to Pain (sec) | Time to Burn (sec) | Time to Pain (sec) | Time to Burn (sec) |
| 1 | 37.0 | >40 | 11.5 | 18.0 | 7.0 | 11.0 |
| 2 | 27.1 | >40 | 10.1 | 16.2 | 11.1 | 16.0 |
| 3 | 29.0 | >40 | 9.2 | 18.3 | 10.3 | 15.5 |
| 4 | 27.5 | >40 | 14.1 | 24.5 | 11.5 | 17.1 |
| 5 | 28.2 | >40 | 21.1 | 36.5 | 7.8 | 11.9 |
| Average | 29.8 | >40 | 13.2 | 22.7 | 9.5 | 14.3 |

The fabric according to the invention, hereinafter, Reflector, is in a different class from Freund because Freund requires a fifth flame retardant heat sealable film over the reflective layer. This will greatly compromise the RRP (Radiant Reflective Performance) of the fabric. RRP is critical to reflect the radiant heat load of a flash fire. It will result in heat absorption and much higher temperatures inside the suit, even if the suit survives essentially intact.

The heat from a chemical vapor ignition flash fire is almost all radiant (approximately 2000° F./sec duration).

Reflector has a "mirror"-like surface with very high RRP and since all chemical protection and chemical protector seams are on the back side, no modification to the reflective surface is necessary.

The National Fire Protection Association (NFPA) is generally regarded as the leading authority for specifying minimum performance criteria for protective clothing worn by firefighters and municipal hazardous materials responders (HAZMAT). A number of performance based pass/fail standards (as opposed to ASTM methodology standards) have been issued for these areas. These performance standards also require third party certification. The two standards discussed herein 1976 and 1991 are current and subject to revision on a three to five year cycle.

NFPA 1976 (92 edition) addresses "specialty protective clothing for firefighting operations other than structural firefighting. It is intended to provide thermal protection from high levels of radiant heat as well as thermal protection from conductive and convective heat present during proximity firefighting operations such as those involving bulk flammable liquids and bulk flammable gases and during aircraft rescue and firefighting."

While it is possible to meet the requirements of both radian and conductive heat using the subject invention, it is the radiant heat protection required as measured by this standard that we are interested in a chemical flash fire that is almost totally radiant heat energy in content.

"NFPA 1991 (94 edition) herein incorporated by reference, addresses vapor-protective suits designed to protect emergency response personnel against exposure to specified chemicals in vapor and liquid splash environments during hazardous chemical emergencies." The standard was written at the request of the United States Department of Transportation (DOT) and has been approved by the American National Standards Institute (ANSI).

This standard defines many performance requirements including chemical resistance and resistance ot flame impingement. The purpose of the invention is to meet or exceed the combined requirements of radian resistance defined in NFPA 1976 and chemical and flammability resistance defined in NFPA 1991 utilizing only one layer of a protective fabric. Until now, multiple garments were required to be worn at one time to provide the combined protection specified by these standards.

It has been discovered that under actual flash fire conditions small pin holes will develop on the inside of the subject chemical barrier film layer. The location of the pin hole was always in the area of a triangular fold or crease in the fabric during the flash. This area occurs in all flexible fabrics and is the point at which three fold lines or raised areas meet. The holes were not of immediate concern since the suit survived in tact and the vapor threat from the chemical is basically consumed by the flash fire as fuel. The purpose of the suit is to protect against chemical threat but also to allow the wearer to escape if a flash of the vapor should occur. The suit (fabric) would fulfill these objectives.

While the fabric meets its objective, it is desirable to eliminate the formation of pin holes. It is believes that these small holes are created by conductive heat at the point of the triangular fold. A solution has been found in adding an insulating layer between the chemical protective film and the flame blocking fabric. Such an insulating layer between the flame impingement layer and the chemical permeation barrier layer can be comprised of a nonwoven fabric; an aramid fiber such as Nomex Kevlar and the like. The insulating layer can also be formed of cellulose containing material such as spunlaced pulp/polyester, nonwoven cotton and the like.

While I have shown my invention in one form, it will be obvious to those skilled in the art that it is not so limited but is susceptible of various changes and modifications without departing from the spirit thereof.

What I claim is:

1. A flash fire and chemical barrier fabric for use in fabricating a hazardous materials handling suit in reverse order consisting essentially of:
   a chemical barrier for prevention of chemical permeation forming a first layer of a multi-layered composite, a first layer comprised of at least one stratum selected from the group consisting essentially of polyvinylene chloride, ethylenevinyle acetate, chlorinated polyethylene, ethyl vinyl alcohol, low density polyethylene, polyethylene, linear low density polyethylene, nylon, polyvinyl alcohol, polyester, polytetrafluoroethylene, fluorinated ethylene propylene, propylene, polyvinyl chloride copolymer, acrylic, acrylic nitryl, high density polyethylene and mobilized polyester; this chemical barrier is to minimize permeability;
   a flame barrier for prevention of flame impingement forming a second barrier layer of flame resistant fabric comprised of a fabric made from fibers selected from the group consisting essentially of of fiberglass, carbonized fibers, flame retardant rayon, flame retardant cotton, flame retardant wool and aramid fibers; and
   a radiant barrier for reflection of radiant energy forming a third layer comprised of metallized film which is resistant to ignition in said fabric for at least three seconds when subject to open flame.

2. A chemical barrier fabric as defined in claim 1 wherein said chemical barrier means contains a thermoplastic resin stratum which binds said flame barrier means to said barrier means when heat and pressure are selectively applied thereto.

3. A fabric as defined in claim 1 wherein an adhesive tie film is deposed between said chemical barrier means and said flame barrier means.

4. A fabric as defined in claim 1 wherein said flame barrier means and chemical barrier means are bonded by an extruded laminated layer therebetween.

5. A chemical barrier fabric as defined in claim 1 wherein said radiant barrier means is stainless steel sputtered onto said flame barrier means.

6. A fabric as defined in claim 1 wherein said chemical barrier means is bonded to said flame impingement means by applying heat and pressure to said layers such that said fabric has a tensile strength in excess of 200 pounds in the cross direction and 400 pounds in the machine direction.

7. A fabric as defined in claim 1 wherein said fabric creates a flash fire barrier wherein said flash fire is in the ambient atmosphere exposes the radiant barrier means and the chemical barrier fabric providing an interior surface temperature of less than about 175 degrees fahrenheit.

8. A flash fire resistant and chemical barrier fabric from the wearer, consisting essentially of:
   A multi-stratum layer chemical barrier means for prevention of chemical permeation forming a first layer, said first layer bound to a flame barrier means for prevention of flame impingement forming a second layer, said second layer bound to a radiant means for reflection of radiant energy forming a third layer, said second layer bound between the first layer chemical barrier means and the third layer radiant barrier means.

9. A flash fire and chemical barrier fabric for use in fabricating a hazardous materials handling suit in reverse order consisting essentially of:
   a chemical barrier for prevention of chemical permeation forming a first layer of a multi-layered composite, a first layer consisting essentially of the group polyvinylidene chloride, ehtylenevinyle acetate, chlorinated polyethylene, polyethylene, low density polyethylene, linear low density polyethylene, high density polyethylene, nylon, polyvinyl alcohol, polyester, metallized polyester, polytetrafluoroethylene, fluroinated ethylene propylene, propylene, polyvinyl chloride copolymer, acrylic, acrylonitrile, and ethylene vinyl alcohol; this chemical barrier is to minimize permeability;
   a flame barrier for prevention of flame impingement forming a second barrier layer of flame resistant fabric consisting essentially of the group of a fiberglass, carbonized fibers, flame retardant rayon, flame retardant cotton, flame retardant wool and aramid fibers;
   a radiant barrier for reflection of radiant energy forming a third layer consisting essentially of the group of metallized film which is resistant to ignition in said fabric for at least three seconds when subject to open flame; and
   said radiant barrier means is stainless steel sputtered onto said flame barrier means.

* * * * *